United States Patent [19]

Shapiro et al.

[11] 4,455,974

[45] Jun. 26, 1984

[54] GAS BEARING PISTON ASSEMBLY

[75] Inventors: Wilbur Shapiro, Schenectady, N.Y.; Sargit S. Bupara, New Milford, Conn.

[73] Assignee: Cummins Engine Company, Inc., Columbus, Ind.

[21] Appl. No.: 223,314

[22] Filed: Jan. 8, 1981

[51] Int. Cl.³ .............................................. F01L 11/00
[52] U.S. Cl. .................................... 123/47 R; 92/183; 92/199; 123/47 AB; 123/193 P
[58] Field of Search ............ 123/47 R, 47 AB, 193 R, 123/193 P; 92/162, 182, 183, 199; 277/174

[56] References Cited

U.S. PATENT DOCUMENTS

| | | | |
|---|---|---|---|
| Re. 20,256 | 1/1937 | Wuerfel | 277/76 |
| 665,506 | 1/1901 | Carlson | 92/183 |
| 1,754,625 | 4/1930 | Henning et al. | 29/156.6 |
| 1,911,736 | 5/1933 | Wilkening | 277/76 |
| 2,468,980 | 5/1949 | Huber | 92/182 |
| 2,983,098 | 5/1961 | Bush | 60/13 |
| 3,001,609 | 9/1961 | Macks | 92/182 |
| 3,335,643 | 8/1967 | Wentworth | 92/182 |
| 3,969,004 | 7/1976 | Schliemann | 308/9 |

FOREIGN PATENT DOCUMENTS

| | | | |
|---|---|---|---|
| 584656 | 7/1933 | Fed. Rep. of Germany | 123/193 P |
| 407426 | 10/1944 | Italy | 92/182 |

*Primary Examiner*—Craig R. Feinberg
*Attorney, Agent, or Firm*—Sixbey, Friedman & Leedom

[57] ABSTRACT

A gas bearing supported piston assembly (2) for an internal combustion engine including a piston body (14, 14') and a segmented piston ring (3) arranged to expand to compensate for wear. A piston supporting gas layer (27) is formed between the cylinder walls (8) and the exterior surface of each piston ring segment (32) by means of a plurality of restricted flow passages (40) formed in each segment (32) and extending between the inner and outer surfaces of the segment (32). In one embodiment, gas under pressure is supplied to the ring segments (32) through a single annular cavity (36) formed in piston body (14). In another embodiment, gas under pressure is supplied to the ring segments (32) through a plurality of corresponding holes (70) in piston body (14').

25 Claims, 14 Drawing Figures

GAS BEARING PISTON ASSEMBLY

DESCRIPTION

1. Technical Field

This invention relates to a gas bearing for a piston assembly, and, in particular, a gas bearing for supporting a piston within an internal combustion engine.

2. Background Art

Because the primary function of any bearing structure is to reduce friction between two relatively moving parts, a gas bearing, with its extremely low frictional characteristics, would appear to be an ideal type of bearing structure. The universal application of gas bearings, however, has been impeded by a number of associated structural and functional difficulties. For example, gas bearings are normally more complicated and expensive than the bearings they are designed to replace. A source of replenishing gas is usually required and/or careful attention must be given to preventing or controlling the leakage of gas from the gas layer which separates the relatively moving surfaces. Such attention normally requires exacting control over the dimensions of the clearance space between the moving surfaces and the pressures within the gas layer forming the bearing.

The difficulties noted above are especially acute when the gas bearing is required to resist substantial loads as, for example, exist between the piston and cylinder walls of an internal combustion engine. Some attempts have been made to employ gas bearing supported pistons in this environment as disclosed in U.S. Pat. No. 3,001,609 wherein the gas pressure in the combustion chamber is used to provide a supply of gas for the bearing. This arrangement overcomes the difficulty referred to above of providing a source of gas. Nevertheless, gas bearing supported pistons have not found widespread commercial application in internal combustion engines, in part, because extremely high bearing loads are encountered in this environment and because the widely varying pressures within the combustion chamber cause irregular gas flow in the bearing gas layer. While gas bearings could be constructed to handle such loads, using known design techniques, the operating life could not be expected to be sufficient to render such bearings practical. U.S. Pat. Nos. 1,754,625; 2,983,098 and 3,969,004 disclose additional examples of gas supported pistons but do not disclose structure which is capable of insuring long bearing life.

Internal combustion engine pistons are normally equipped with one or more circumferential rings resiliently biased into engagement with the cylinder walls. In some instances, this resilient bias is provided inherently by splitting the ring and forming the ring of resilient material. In other instances, the resilient force is provided by a spring element interposed between the ring and piston such as illustrated in U.S. Pat. Nos. 1,911,736 and 2,468,980 and U.S. Reissue Pat. No. 20,256. It has also been suggested to provide a fluid path so that the instantaneous gas pressures within the combustion chamber will be applied to the interior surface of the ring to prevent momentary collapse of the ring at times of peak gas pressures within the combustion chamber such as illustrated in U.S. Pat. No. 3,335,643. In instances where ring wear is known to be a problem, it has further been suggested to form the ring of end-to-end arcuate segments. However, none of these more conventional piston ring disclosures suggests how to solve the complex problem of forming an air bearing which insures proper support for a piston while achieving long life and reliability by means of structure which is sufficiently simple to be commercially practical.

DISCLOSURE OF THE INVENTION

An object of this invention is to overcome the deficiencies of the prior art by providing an effective and practical air bearing for supporting a piston within a cylinder.

Yet another object of the subject invention is to provide a gas bearing supported piston for an internal combustion engine arranged to reduce engine parasitic losses, operate at extremely high temperatures, absorb piston side loading without piston or piston ring contact and compensate for wear.

Another object of this invention is to provide an air bearing for supporting a piston within the cylinder of an internal combustion engine including a radially expandable and compressible ring positioned within an annular recess formed in the peripheral wall of the piston wherein the ring is separated from the cylinder walls by a gas layer supplied with combustion gas through passages formed in the radially expandable and compressible ring.

Another object of this invention is to provide an air bearing supported piston which is highly reliable in operation and is capable of maintaining the piston out of direct contact with the walls of a cylinder despite heavy lateral forces imposed on the piston.

Still another object of the subject invention is to provide a gas bearing supported piston having extremely long life due to the provision of an air bearing supported piston ring which automatically compensates for wear.

Another object of the subject invention is to provide an air bearing supported piston ring formed in arcuate segments shaped to cooperate with an annular recess in the piston in a manner to resist twisting motion resulting from pressure changes along the axial length of each arcuate ring segment.

Still another object of the subject invention is to provide a multi-segment, air bearing-supported piston ring for an internal combustion engine wherein each segment is biased outwardly by the pressure of gas stored within a reservoir contained within the piston and biased inwardly by the bearing gas layer and further wherein the outward bias is designed to fall between the operating limits of the inwardly directed force imposed on each segment by the bearing gas layer to cause the individual segments to seek a force balanced equilibrium position.

Yet another object of the subject invention is to provide a gas bearing supported piston for use in a four stroke internal combustion engine to provide a controlled leakage seal for the high pressure gas acting on the piston during the compression and ignition strokes.

The above and additional objects of this invention are achieved by means of a piston assembly for an internal combustion engine including a piston body containing a reservoir for storing gas supplied from the combustion chamber and an annular recess formed in the peripheral wall of the piston body to receive a segmented piston ring. Each segment of the ring is biased outwardly in response to the pressure of gas stored in the reservoir acting on a limited portion of the interior surface of each piston ring segment. The outward force is balanced by an inward force imposed by the bearing gas layer formed between the exterior surface of each piston ring segment and the interior surface of the cylinder within which the piston is placed. Because the pressure exerted by the gas bearing layer is a function of the thickness of the gas bearing layer and because the outwardly directed force acting on the individual ring segments is inherently designed to fall between the normal operating limits of the inward force, each segment inherently seeks an operatively equilibrium position which tends to hold the piston out of direct contact with the walls of the cylinder. Because the gas bearing layer between the piston and the cylinder wall is subject to pressure variations within the combustion chamber, the annular recess in the peripheral wall of the piston has been formed in a manner to cause the upper interior surface of each ring segment to be subjected to combustion chamber gas pressure to assist in balancing the net force moments on each ring segment.

Still other and more specific objects of the subject invention may be appreciated by considering the following Brief Description of the Drawing and Best Mode for Carrying Out the Invention.

BEST MODE FOR CARRYING OUT THE INVENTION

Figure 1:
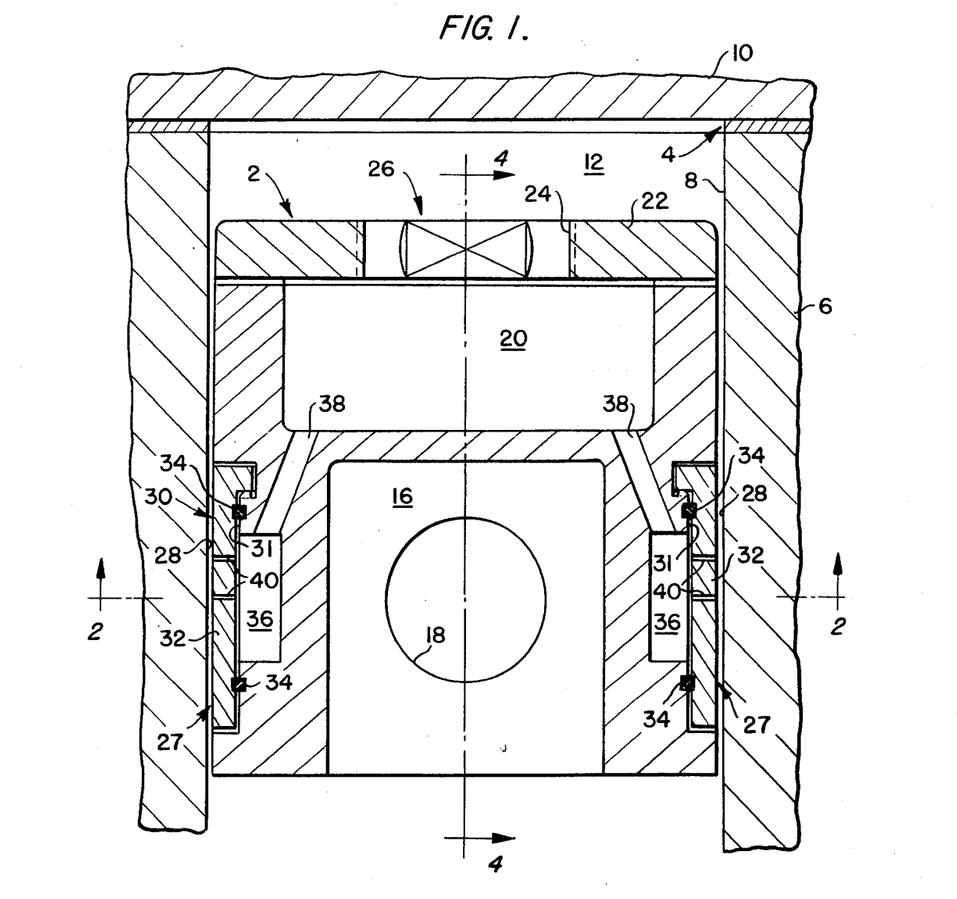
FIG. 1 is a cross-sectional view of an air bearing supported piston assembly designed in accordance with the subject invention and taken along a plane passing through the longitudinal axis of the piston assembly.

For a clearer understanding of the subject invention, reference is initially made to FIG. 1 disclosing an gas bearing supported piston assembly designed in accordance with the subject invention positioned within the cylinder of an internal combustion engine. As is conventional, the cylinder is formed in an engine block 6 containing a bore which defines the interior walls 8 of the cylinder. The outer end of the bore is closed by the engine head 10 to form a combustion chamber 12 within cylinder walls 8 between the head 10 and the upper surface of the piston assembly 2. As illustrated in FIG. 1, the piston assembly 2 includes a piston body 14 containing a lower cavity 16 for receiving the upper end of a connecting rod (not illustrated). A pair of aligned openings 18 are formed in the walls defining cavity 16 to receive a pin (not illustrated) for connecting the piston body to the connecting rod.

Unlike conventional pistons, piston body 14 includes a reservoir chamber 20 in the upper portion thereof. Reservoir chamber 20 is closed by a top plate 22 containing a central opening 24 through which the reservoir chamber 20 communicates with combustion chamber 12. Although not illustrated in detail, central opening 24 includes a check valve 26 which operates as a gas trapping means for allowing gas to flow from the combustion chamber 12 into the gas reservoir chamber 20 when the gas pressure in the combustion chamber is above the gas pressure within the reservoir chamber 20 and for impeding reverse flow when the gas pressure in the combustion chamber 12 is below the gas pressure within the reservoir chamber 20. As is well understood, combustion chamber 12 varies in volume during the reciprocating motion of piston assembly 2 and will experience widely varying pressure changes as a result of this motion, the ignition of combustible mixtures and the operation of the engine intake and exhaust valves (not illustrated). In a four cycle internal combustion engine, the intake and exhaust valves are operated in synchronism with the reciprocating motion of the piston assembly to define repeated cycles of intake, compression, power and exhaust strokes. Higher pressures will exist during the compression and power stroke than during the intake and exhaust strokes. If the stored gas pressure in reservoir 20 has decreased below the peak pressures reached during the compression and power strokes, check valve 26 will open to allow gas to flow into the reservoir to tend to equalize the pressure therein. Subsequently, as the pressure in the combustion chamber 12 decreases, check valve 26 will close, thereby trapping gas under high pressure. Reservoir 20 can thus provide a suitable source of gas under pressure for a gas bearing.

As will be explained in greater detail hereinbelow, a gas bearing layer 27 supports piston assembly 2. This layer is formed in the clearance space 28 separating piston body 14 from cylinder walls 8. This supporting layer 27 of gas is formed in part by means of a radially expandable ring 30 received within an annular recess 31 contained in the exterior peripheral wall of piston body 14. Ring 30 is formed by a plurality of end-to-end arcuate ring segments 32 positioned within recess 31. Each ring segment 32 includes a pair of parallel grooves for receiving, portions of resilient seal rings 34 positioned, respectively, in grooves contained in piston body 14. As is evident from FIG. 1, seal rings 34 are arranged in a pair of planes perpendicular to the longitudinal axis of piston body 14 thereby permitting ring segments 32 to move radially inwardly and outwardly with respect to piston body 14.

The interior surface of each ring segment 32 is subjected to gas pressure to create a force which tends to move the ring segment 32 radially outwardly. This force is formed by a biasing means including an expandable gas cavity 36 located radially inwardly of the ring segments 32 between upper and lower seal rings 34. Cavity 36 communicates with gas reservoir chamber through passages 38. As is apparent from FIG. 1, cavity 36 in combination with seal rings 34 and corresponding ring segments 32 define an expandable gas cavity. It can thus be seen that passages 38 and cavity 36 form biasing means for imparting to ring 30 an outwardly directed force.

Each segment 32 includes at least one, and preferably several, restricted flow passages 40. In combination, the restricted flow passages 40 form gas flow restriction means which communicate with the source of gas formed in reservoir chamber 20 and cavity 36 to provide a controlled flow of gas into the gas layer 27 in an amount which causes the gas layer 27 to impart a radially inwardly directed force on each ring segment 32. The radially inwardly directed force varies circumferentially between upper and lower operating limits and is non-linearly and inversely proportional to the radial thickness of the corresponding circumferential portion of the gas layer 27. This phenomena can best be understood by realizing that the gas supplied through restricted flow passages 40 tends to move substantially axially within gas layer 27 and that the pressure generated on the exterior of each ring segment 32 is roughly proportional to the degree of resistance which the gas experiences in exiting from the clearance space 28 formed between the ring segments 32 and the corresponding portion of the interior cylindrical wall 8. The area on the interior surface of each ring segment 32 exposed to the gas pressure in reservoir 20 and the size and number of restricted flow passages 40 are carefully chosen to cause the net radially outwardly directed force on the individual ring segments 32 to fall between the upper and lower operating limits of the inwardly directed force imposed on each ring segment 32 by the gas layer formed in clearance space 28.

It can now be appreciated, that each ring segment 32 will tend to seek a force-balanced radial position which is a function of the pressure exerted on the exterior surface by gas layer 27 and the pressure exerted on the interior surface thereof by the gas stored in reservoir chamber 20 plus the lateral loads imposed by piston body 14 through resilient seal rings 34. Because the pressure exerted by the gas layer 27 in clearance space 28 is related to the gas pressure in reservoir chamber 20 by virtue of their interconnecton through restricted flow passages 40, a broader operating range is achieved despite some pressure variations in the gas stored in reservoir chamber 20.

Figure 2:
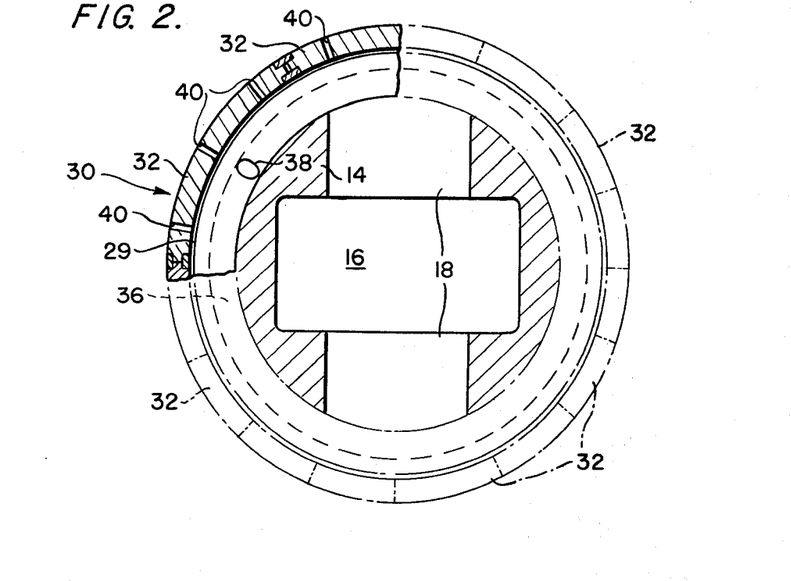
FIG. 2 is a cross-sectional view of the piston assembly illustrated in FIG. 1 taken along lines 2—2.

FIG. 2 is a cross-sectional view of the piston assembly illustrated in FIG. 1 taken along lines 2—2 wherein the arrangement of piston ring segments in end-to-end configuration within annular recess 31. From FIG. 2 it can be seen that the ring segments 32 number six in total (only one is illustrated in detail) and are identical in shape. This number of rings, however, can be varied in accordance with the specific application for which the gas bearing supported piston is designed. Each ring segment 32 may contain two sets of three equal angularly positioned restricted flow passages 40 with the two sets being positioned in parallel planes perpendicular to the central axis of piston ring 30. In order to achieve substantially equal pressure effect on each ring segment 32, a separate passage 38 is provided for each of the ring segments 32 extending between gas cavity 36 and reservoir chamber 20. It should also be noted that the outlet of each passage 38 is centered between the circumferential ends of each ring segment 32 to again equalize the effect of fluid flow from reservoir chamber 20 into gas cavity 36.

Figure 3A:
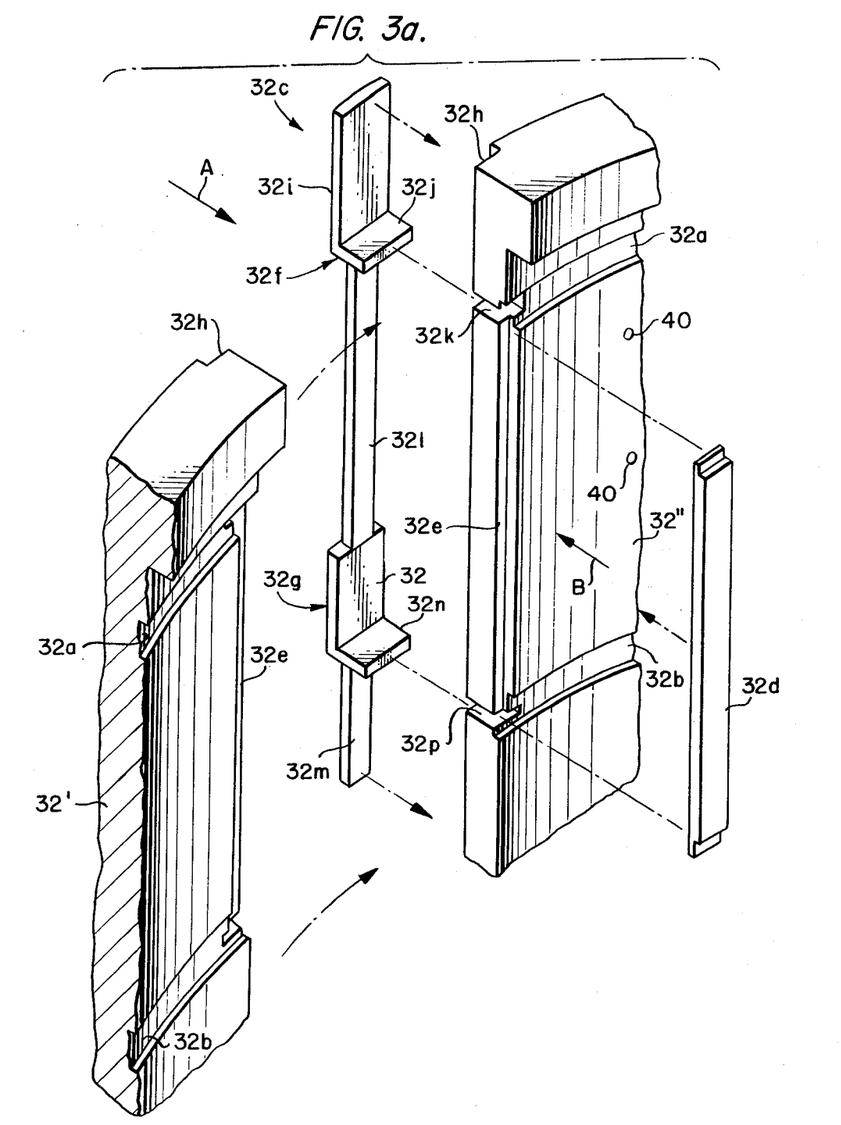
FIG. 3a is a broken away exploded perspective view of an end-to-end joint formed between a pair of arcuate ring segments of the gas bearing supported piston ring designed in accordance with the subject invention.

Turning now to FIG. 3a, an exploded view is shown of the end-to-end joint between two successive ring segments 32' and 32". The interior surface of each ring segment 32 contains an upper groove 32a and a lower groove 32b for receiving outward radial portions of resilient seal rings 34 (not illustrated in FIG. 3a). A butt joint seal structure 32c is illustrated in FIG. 3a and is designed normally to seal the end-to-end joint between adjacent ring segments such as segments 32' and 32" but will allow some breathing as the ring segments move radially. Seal structure 32c includes an interior insert or strip 32d spanning the joint between segments 32' and 32" along the axial length extending between grooves 32a and 32b. A notch 32e is formed on the interior edge of each segment 32' and 32" to receive corresponding portions of interior insert 32d such that the interior surface of insert 32d can be made flush with the interior surfaces of segments 32' and 32". Seal structure 32c also includes an upper exterior insert 32f and a lower exterior inert 32g shaped to span the joint between segments 32' and 32" on the exterior surface of the multi-segment piston ring 30. Together, insert 32f and insert 32g extend end-to-end over the entire axial length of the joint between segments 32' and 32". As illustrated in FIG. 3a, segments 32' and 32" contain edge notches 32h shaped to receive corresponding portions of inserts 32f and 32g to cause the exterior surfaces of these inserts to be flush with the exterior surface of piston ring 30 when fully assembled. Upper exterior insert 32f includes an upper section having a first leg 32i extending generally in an axial direction in grooves 32h and a second leg 32j extending radially inwardly in correspondingly shaped portions 32k of notches 32h. Only the notch portion 32k contained in segment 32" is visible in FIG. 3a. The lower section of upper exterior insert 32f is formed by an axially extending leg 32l having a circumferential extent which is substantially less than the circumferential extent of leg 32i. As will be explained in more detail below, this configuration of the inserts of FIG. 3 is designed to insure that the respectively inserts are held in gas sealing contact with corresponding surfaces of the ring segments.

Lower exterior insert 32g is shaped in a form similar to upper exterior insert 32f except that leg 32m forming the lower section is axially shorter than corresponding leg 32l of upper exterior insert 32f. Legs 32t and 32n of insert 32g correspond to legs 32i and 32j, respectively. Radially inwardly directed leg 32n is received in notch portion 32p for retaining insert 32g in a relatively fixed axial position. It is now clear from FIG. 3a that seal structure 32c functions to overlap the end-to-end joints formed between adjoining segments 32 to form a substantially gas impervious seal between the interior and exterior surfaces of piston ring 30 except for the contolled flow of gas through restricted flow passages 40. At the same time, each ring segment 32 is allowed to expand radially outwardly for a limited distance into clearance space 28 in response to increased outwardly directed forces acting on the ring segment. The interior surface of interior insert 32d and the exterior surface of exterior inserts 32f and 32g may be machined at the same time as the corresponding interior and exterior surfaces of the end-to-end ring segments. By this technique, the surfaces of the ring segments 32 and seal structures 32c can be made virtually perfectly flush.

Figure 3B:
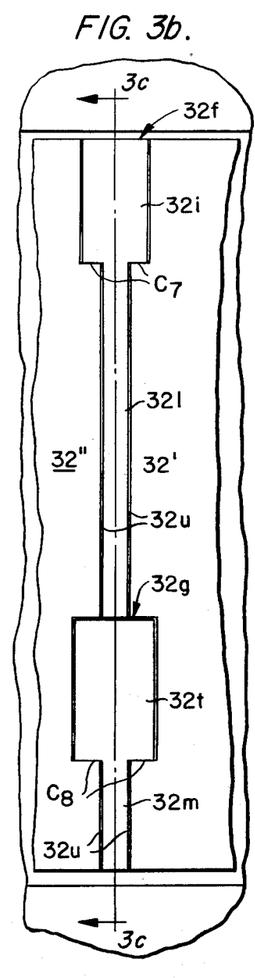
FIG. 3b is a broken away outside elevational view of the end-to-end joint illustrated in FIG. 3a taken in the direction of arrow A wherein the components are illustrated in assembled condition.
Figure 3C:
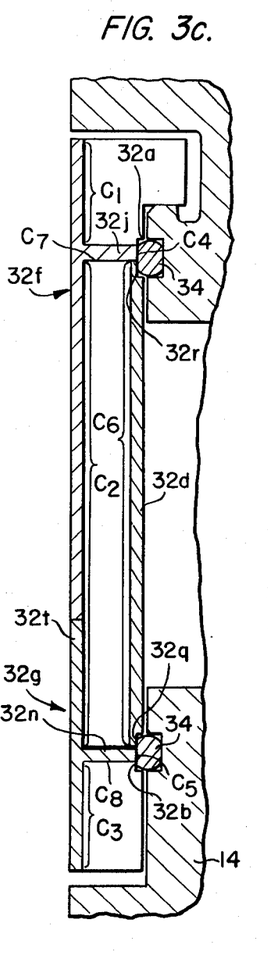
FIG. 3c is a broken away, cross-sectional view of the assembled joint illustrated in FIG. 3b taken along lines 3c—3c.
Figure 3D:
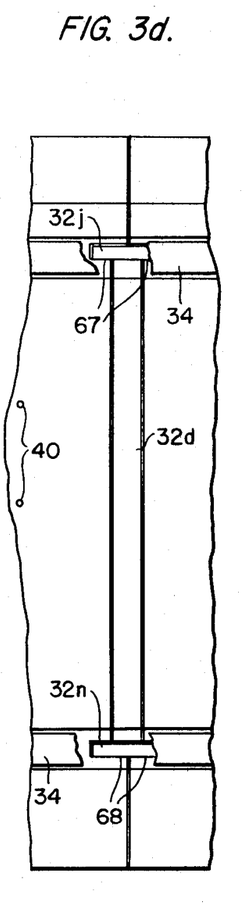
FIG. 3d is a broken away inside elevational view of the end-to-end joint illustrated in FIG. 3a taken in the direction of arrow B wherein the components are illustrated in assembled condition.

FIGS. 3b, 3c and 3d show additional views of the joint between a pair of an end-to-end ring segments 32. In particular, FIG. 3c illustrates the precise operational relationship of the interior and exterior inserts of seal structure 32c with resilient seal rings 34. Because the outer radial surfaces of exterior inserts 32f and 32g are exposed to the gas pressures in gas layer 27, these inserts are generally biased radially inwardly against the surfaces of edge notches 32h to form gas sealing contact along surfaces identified by brackets $C_1$, $C_2$ and $C_3$ in FIG. 3c. The radial length of legs 32j and 32n are chosen to cause the innermost ends thereof to be held in direct contact with corresponding seal rings 34 at $C_4$ and $C_5$. The ends of inner insert 32d contain notches 32r and 32q which are shaped to contact the exterior surface of seal rings 32 and cause insert 32d to be biased outwardly into sealing engagement with notches 32e of the ring segments 32. The outward force on inner insert 32d supplied by seal rings 32 is aided by the gas pressure in cavity 36 which acts on the inner surface of the inner insert 32d and thus insures a gas seal along the contacting surfaces identified by bracket $C_6$. Because the upper section of upper exterior insert 32f formed by legs 32i and 32j has a greater circumferential extent than the lower section formed by leg 32l (FIGS. 3a and 3c), insert 32f tends to be biased downwardly as illustrated in FIGS. 3a-3d to form a gas sealing contact between surfaces identified by $C_7$ in FIGS. 3b-3d. Similarly, the upper section of lower exterior insert 32g formed by legs 32t and 32n has a greater circumferential extent which causes insert 32g to be biased downwardly to form gas sealing contact surfaces designated by $C_8$ in FIGS. 3b-3d. A small clearance 32u (FIG. 3b) is formed between the sides of legs 32 and 32m to allow the space between the ends of the ring segments to breath as the segments move radially.

Figure 4:
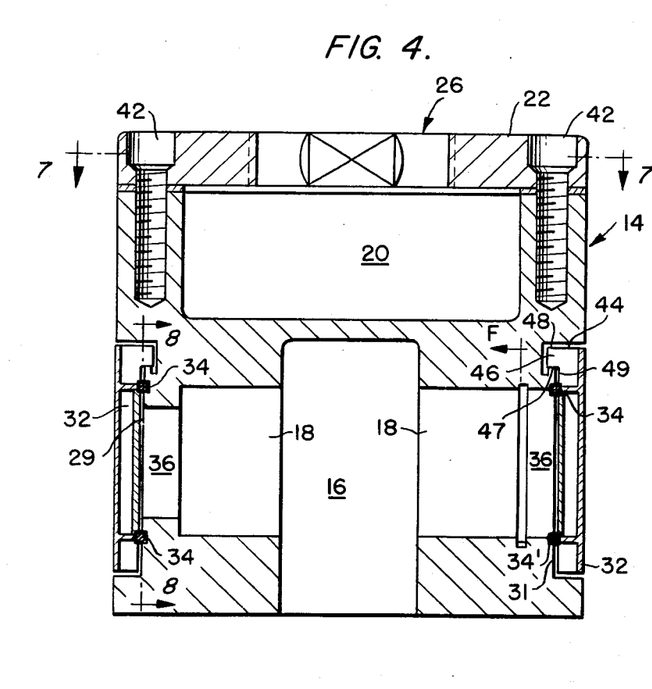
FIG. 4 is a cross-sectional view of the piston assembly of FIG. 1 taken along lines 4—4.

FIG. 4 is a cross-sectional view of the piston assembly illustrated in FIG. 1 taken along lines 4—4. Corresponding elements illustrated in FIG. 4 are assigned the same reference numerals as in FIG. 1. In addition, FIG. 4 discloses that top plate 22 is connected to the piston body 14 by a plurality of threaded bolts 42, only two of which are illustrated. As is evident in FIGS. 1, 3a and 4, the upper axial end 44 of each ring segment 32 includes an inwardly directed flange 46 adapted to be received in a recessed groove 48 formed at the upper axial end of annular recess 31. The lower face of flange 46 rests on an upstanding ridge 47 formed in annular recess 31 to provide a fulcrum for the corresponding ring segments. Placement of the fulcrum at the upper end of each ring segment 32 rather than at the lower end is critical to avoid the possibility that the ring segments will become twisted relative to the longitudinal axis of the piston body and thus come into contact with the interior walls 8 of the cylinder. A clearance is provided between the uppermost end of each ring segment 32 and the corresponding portion of the annular recess 31 to provide a gas flow passage into groove 48. At the same time, gas pressure in the clearance space between the upper portion of piston body 14 and cylinder wall 8 is transferred to the interior surface of flange 46 and thus the pressure tends to increase when the gas pressure increases in the combustion chamber 12 during the compression and power (ignition) strokes. As will be explained below, radially oriented notches may be formed in ridge 47 to cause the gas pressure in groove 48 to be applied also to the interior surface 49 of each ring segment 32 between seal ring 34 and flange 46.

Figure 5A:
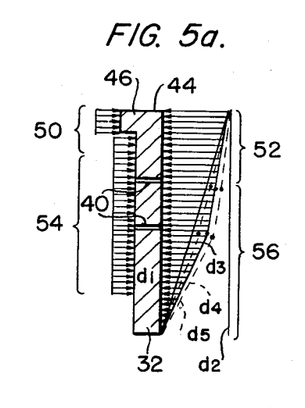
FIG. 5a is a force diagram illustrating the pattern of gas pressure induced forces on a radial cross-section of a piston ring segment during the compression and power strokes of a four cycle internal combustion engine equipped with the gas bearing supported piston assembly of FIGS. 1 and 4.
Figure 5B:
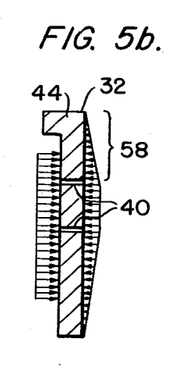
FIG. 5b is a force diagram illustrating the pattern of gas pressure induced forces on a radial cross-section of a piston ring segment during the intake and exhaust strokes of a four cycle internal combustion engine equipped with the gas bearing supported piston assembly of FIGS. 1a and 4.

FIGS. 5a and 5b illustrate the resulting pattern of gas pressure induced forces on each ring segment 32 during corresponding piston assembly strokes. In particular, FIG. 5a illustrates the gas pressures which occur during the compression and power stroke where it can be seen that substantial forces denoted by arrows 50 and 52 operate on opposite sides of the upper axial end 44 of each ring segment 32. The forces applied to the interior surface of each segment by gas pressure supplied through passages 38 (not illustrated) and cavity 36 are represented by arrows 54 while the pressure exerted on the exterior surface by the gas layer 27 formed in clearance space 28 due to the flow of gases through restricted flow passages 40 is illustrated by arrows 56. By sujecting the interior surface of flange 46 to the forces represented by arrow 50, the axially unbalanced force pattern produced by the forces represented by arrows 52 and 56 tends to be balanced out. Moreover, by sizing the restricted flow passages 40 so that in the normal concentric position of the piston ring, the pressure at the upper and lower passages 40 illustrated in FIG. 5a fall between the minimum obtainable (illustrated by line $d_1$) and the maximum obainable (compression or ignition pressure illustrated by line $d_2$), the piston ring will have positive stiffness and can sustain load without the piston ring or piston contacting the cylinder wall. Any tendency to close the clearance will cause the gas pressure (represented by solid line $d_3$) in layer 27 to increase causing the radially inwardly directed force (represented by arrows 52 and 56) applied to ring segment 37 also to increase. Conversely, opening of the clearance will cause the radial force applied to segment 32 to decrease. The force distribution will vary between a maximum (dashed line $d_4$) and a minimum (dashed line $d_5$).

In contrast to the situation illustrated in FIG. 5a, reference is made to FIG. 5b which represents the axial pattern of forces impinging on each ring segment 32 during the intake and exhaust strokes of the piston assembly 2 at which time the gas pressure in combustion chamber 12 will be at a relatively low level. Accordingly, the magnitude of the forces represented by arrows 58 is shown to decrease from a high point adjacent the outlet of upper restricted passage 40 to a low point adjacent the upper axial end 44 of the ring segment. It can be seen from FIG. 5b that the axial distribution of forces on each ring segment 32 during the intake and exhaust strokes are approximately balanced.

Figures 6, 8, 10:
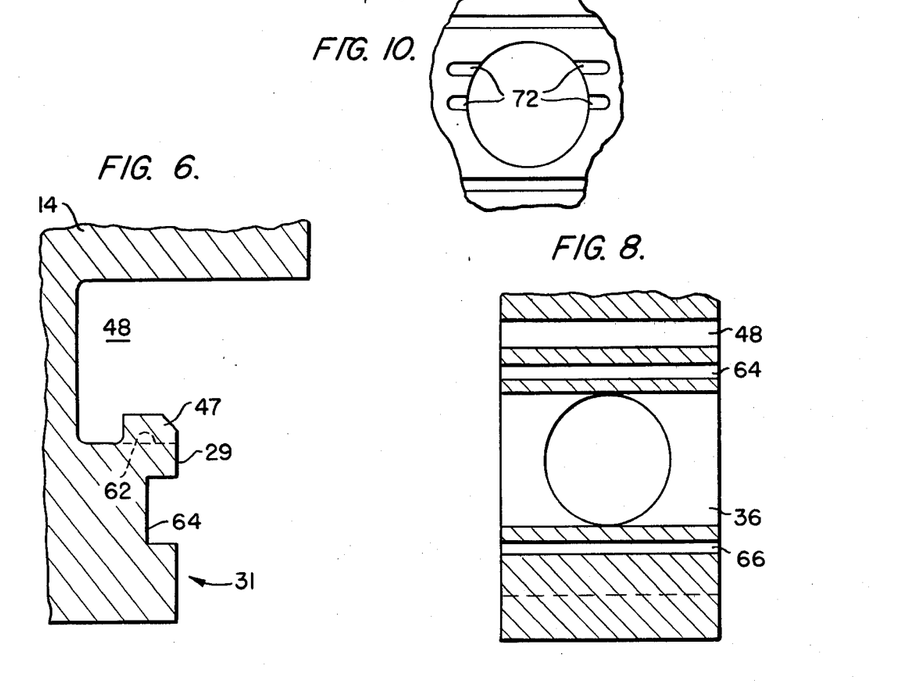
FIG. 6 is an enlarged fragmentary cross-sectional view of a portion of the annular recess contained in the piston body encircled by lines 6—6 of FIG. 4.
FIG. 8 is a broken away cross-sectional view of the piston body illustrated in FIG. 4 taken along lines 8—8.
FIG. 10 is a broken away side elevational view of the piston body illustrated in FIG. 9 taken in the direction of arrow C.

FIG. 6 is an exploded view of groove 48 formed at the upper axial end of annular recess 31 (see FIG. 4). The lower surface defining one side of the groove 48 includes ridge 47 arranged to contact the lower surface of radially inwardly directed flange 46 to provide an axial stop for limiting relative axial movement of the ring segments with respect to the piston body 14. As noted above, ridge 47 also provides a fulcrum for the ring segments 32. Ridge 47 contains a plurality (for example 12) notches 62 (illustrated by a dash line) formed at equally spaced intervals around the circumference of ridge 47 to insure that adequate gas flow occurs in this region to provide an even force distribution on the interior surface 49 of flbange 46 as illustrated in FIG. 4. FIG. 6 further illustrates a circumferential groove 64 formed in piston body 14 to receive resilient upper seal ring 34 (not illustrated).

Figure 7:
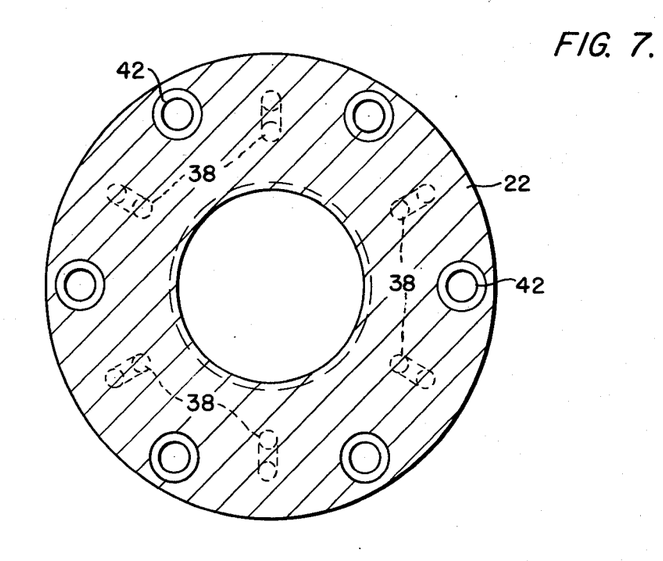
FIG. 7 is a cross-sectional view of the piston assembly illustrated in FIG. 4 taken along lines 7—7.

FIG. 7 is a cross-sectional view of the piston assembly illustrated in FIG. 4 taken along lines 7—7 which clearly illustrates the position of the six threaded bolts 42 which secure upper plate 22 to the piston body. FIG. 7 also illustrates the position of the passages 38 which insure an even flow of gases from reservoir chamber 20 into annular cavity 36.

FIG. 8 is a broken away cross-sectional view of a portion of piston body 14 taken along lines 8—8 of FIG. 4 which illustrates the relative position of upper annular groove 64 and the lower annular groove 66 arranged to receive upper and lower resilient ring seals 34 and 34. FIG. 8 further illustrates the position of gas cavity 36 between grooves 64 and 66.

Figure 9:
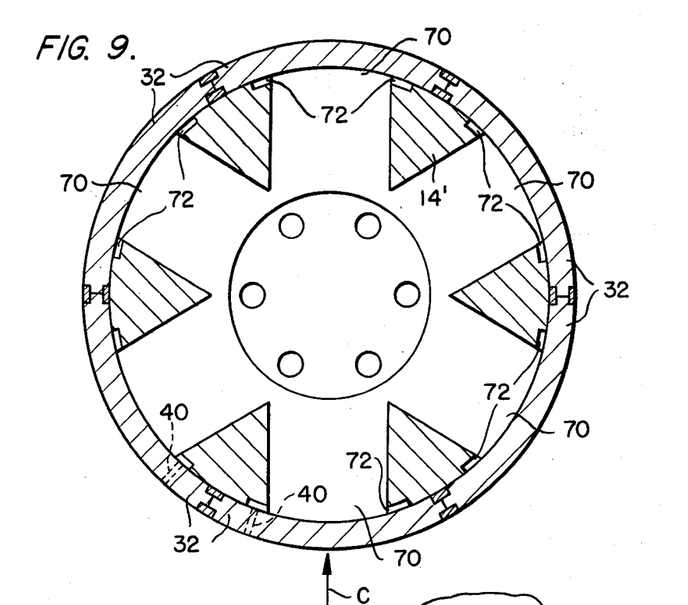
FIG. 9 is a cross-sectional view of a modified embodiment of a gas bearing piston assembly designed in accordance with the subject invention.

FIG. 9 discloses a modified version of the gas bearing supported piston of this invention wherein annular cavity 36 has been repaced by a plurality of radial holes 70 corresponding in number to the number of ring segments 32. The interior ends of holes 70 join toegther in communication with the gas reservoir (not illustrated) of the piston. The outer end of each hole 70 faces the central section of the inner surface of each ring segment 32. The cross-sectional area of each hole is considerably less than the cross-sectional area of the inner surface of each ring segment 32 subjected to gas pressure when the ring segment 32 is spaced radially outwardly from piston body 14. However, the resilient seal rings (not illustrated) are arranged to allow the ring segments 32 to move radially inwardly to contact piston body 14' to thereby reduce the total effective inside area of each ring segment 32 against which gas pressure may be applied. This arrangement reduces the radially outwardly directed force exerted on ring segment 32 while leaving the force applied by gas layer 27 unaffected. Thus, if piston side loading were to tend to move piston 14' toward one side of the cylinder, the restoring force which is exerted by the corresponding ring segment would increase when the segment comes into direct contact with piston body 14'. The chances of the piston ring or piston even coming into contact with the interior walls of the cylinder would thus be decreased.

FIGS. 9 and 10 illustrate grooves 72 extending in a circumferential direction from each hole. These grooves are positioned to insure that gas continues to be supplied to restricted flow passages 40 (only two are shown in FIG. 9) located toward the arcuate ends of each ring segment even when ring segments 32 come into direct contact with piston body 14'.

It is now evident that an gas bearing supported piston assembly has been disclosed of unusually simple design using the naturally occurring peak pressures within the combustion chamber of an internal combustion engine to supply gas to the gas bearing. As is clearly illustrated in FIGS. 1 and 4, the gas bearing is formed by a multi-segment piston ring received in an annular recess which extends over approximately 50% of the axial length of the piston and provides ample radial support sufficient to resist all lateral loads which can be expected on the engine piston during operation thereby preventing the piston from directly contacting the interior wall of the cylinder in which the piston is placed. By forming the piston ring in segments, and allowing each segment to seek a force balanced position induced by gas pressure applied to the interior and exterior surfaces of each segment, automatic compensation will occur for any wear which may occur on the exterior surface of the piston ring or the interior surface of the cylinder. For the reasons discussed above, the individual piston ring segments will tend to center themselves within the cylinder and thus will transmit a centering force to the piston body through resilient seals 34. Axial force balance on each segment is insured by subjecting the upper axial end of each ring segment to the pressure of gas within the combustion chamber occurring during the compression and ignition stroke. In one specific preferred embodiment, the piston ring consists of six equal end-to-end segments for a piston having a 5.500 inch diameter with the axial length of each segment being 1.940 to 1.950 inches. If two rows of 18 equal angularly spaced flow passages 40 are provided in the six ring segments, the flow pasages may be formed with a diameter of 0.014 to 0.015 inches. Resilient seals 34 may be of the type sold by the Goshen Rubber Co. and identified as TETRASEAL #TS33-158 (BUNA-N) when low temperature operation is contempltaed. If high temperature operation is contemplated a resilient metallic ring would be employed.

INDUSTRIAL APPLICABILITY

A gas bearing supported piston has been disclosed which has particular utility in four stroke internal combustion engines. Since the gas bearing permits the elimination of conventional cylinder wall lubricant, the disclosed gas bearing has particular utility in engines designed to operate at higher than conventional temperature. An example of such an engine would be an adiabatic internal combustion engine which operates at a much higher efficiency than is achieved by a conventional nonadiabatic internal combustion engine. The disclosed gas bearing supported piston also has utility in other environments where the piston assembly is designed to operate in a cylinder which is subject to substantial gas pressures. The disclosed split ring gas bearing can be used in any environment where wear compensation is essential to long bearing life.

We claim:

1. A piston assembly for reciprocating movement within a cylinder to form a variable volume chamber containing fluid gas under varying pressure conditions comprising:

(A) a piston body having a peripheral wall shaped to form a slight clearance space with an interior wall of the cylinder when said piston body is co-axially positioned for reciprocating movement within the cylinder, said piston body containing an annular recess formed in said peripheral wall and opening toward the interior wall of the cylinder;

(B) a source of gas under pressure including a gas reservoir chamber contained in said piston body and gas trapping means for allowing gas to flow from the variable volume chamber into said gas reservoir chamber when the gas pressure in the variable volume chamber is above the gas pressure within said gas reservoir chamber and for impeding reverse flow when the gas pressure in the variable volume chamber is below the gas pressure within said gas reservoir chamber; and (C) bearing means for generating a gas layer within the clearance space between said piston body and the interior wall of the cylinder to hold said peripheral wall out of contact with the interior wall of the cylinder during reciprocating movement of said piston assembly, said bearing means including a radially expandable and compressible ring formed in equal arcuate segments extending end-to-end around said piston body positioned within said annular recess in contact with the gas layer, said bearing means further including gas flow restriction means in communication with said source of gas for establishing a controlled flow of gas into the gas layer to cause the gas layer to impart a radially inwardly directed force on said ring which varies circumferentially between limits in inverse proportion to the radial thickness of the corresponding circumferential portion of the gas layer, biasing means for imparting to said ring an outwardly directed radial force having a magnitude intermediate the magnitude limits of said radially inwardly directed force imparted to said ring by the gas layer to cause each circumferential portion of said ring to seek such a force balanced radial position, wherein said biasing means includes gas pressure means for subjecting a predetermined area of an interior surface of each said ring segment defined by a pair of annular resilient seals positioned between said piston body and each said ring segment to provide a predetermined radially outward bias to each said ring segment to gas pressure from said reserovir chamber, and joint sealing means for rendering the end-to-end joints between adjacent ring segments substantially impervious to radial gas flow, wherein each said joint sealing means includes an interior insert spanning circumferentially between said segments and extending axially between said resilient seals and further includes an exterior insert assembly spanning circumferentially between said segments and extending axially along the entire axial extent of said piston segments.

2. A piston assembly as defined in claim 1, wherein said exterior insert assembly includes an upper exterior insert and a lower exterior insert, said upper and lower exterior inserts including radially inwardly directed legs, and wherein said ring segments include complementary notch portions positioned to reverse said radially inwardly directed legs to retain said exterior inserts axially.

3. A piston assembly as defined in claim 2, wherein said interior insert incudes end portions shaped to contact an exterior surface of said resilient seals.

4. A piston assembly for reciprocating movement within a cylinder to form a combustion chamber of an internal combustion engine comprising:
(A) a piston body having a peripheral wall shaped to form a slight clearance space with an interior wall of the cylinder when said piston body is co-axially positioned for reciprocating movement within the cylinder, said piston body containing a gas reservoir chamber for storing gas supplied from the combustion chamber and an annular recess formed in said peripheral wall and opening toward the interior wall of the cylinder;
(B) gas trapping means for allowing gas to flow from the combustion chamber into said reservoir chamber when the gas pressure in the variable volume chamber is above the fluid pressure within said reservoir chamber and for impeding reverse flow when the gas pressure in the variable volume chamber is below the gas pressure within said reservoir chamber; and
(C) bearing means for generating a gas layer within the clearance space between said piston body and the interior wall of the cylinder to hold said peripheral wall out of contact with the interior wall of the cylinder during reciprocating movement of said piston assembly, said bearing means including
  (1) a radially expandable and compressible ring positioned within said annular recess externally in contact with the gas layer,
  (2) gas flow restriction means contained within said ring in communication internally with said gas reservoir chamber for establishing a controlled flow of gas from said reservoir chamber into the gas layer to cause the gas layer to impart a radially inwardly directed force on said ring which varies circumferentially between limits in inverse proportion to the radial thickness of the corresponding circumferential portion of the gas layer, and
  (3) biasing means for imparting to said ring an outwardly directed radial force having a magnitude intermediate the limits of said radially inwardly directed force imparted to said ring by the gas layer to cause each circumferential portion of said ring to seek a force balanced radial position.

5. A piston assembly as defined in claim 4, wherein said ring is formed in equal arcuate segments extending end-to-end around said piston body.

6. A piston assembly as defined in claim 5, wherein said biasing means includes gas pressure means for subjecting a predetermined area of an interior surface of each said ring segment to gas pressure from said reservoir chamber.

7. A piston assembly as defined in claim 6, wherein said biasing means includes an expandable gas cavity, each said ring segment forming a movable wall of said expandable gas cavity.

8. A piston assembly as defined in claim 7, wherein said gas flow restriction means includes at least one restricted flow passage formed in each said ring segment extending between said expandable gas cavity and an exterior surface of said ring segment.

9. A piston assembly as defined in claim 8, wherein the area on the exterior surface of each said ring segment subjected to gas pressure by the gas layer is greater than the area of the interior surface of each said ring segment subjected to gas prssure by said gas pressure means.

10. A piston assembly as defined in claim 9, wherein each said ring segment has an axial length substantially greater than its radial thickness, each said ring segment having an upper axial end closest to the combustion chamber and a lower axial end furtherest from the variable volume chamber.

11. A piston assembly as defined in claim 10, wherein each said flow passage opens into the exterior surface of each said ring segment intermediate the upper and lower axial ends thereof, and wherein said annular recess is formed to cause the interior surface of each said ring segment immediately adjacent said upper axial end to be subjected to the same gas presure as exists within adjacent portions of the gas layer to tend to balance bending moments imparted to said ring segment caused by increasing gas pressure within the combustion chamber.

12. A piston assembly as defined in claim 10, wherein each said ring segment includes a radially inwardly directed flange adjacent said upper axial end, said annular recess including an annular groove shaped and positioned to receive said inwardly directed flange.

13. A piston assembly for reciprocating movement within a cylinder to form a variable volume chamber containing fluid gas under varying pressure conditions comprising:
 (A) a piston body having a peripheral wall shaped to form a slight clearance space with an interior wall of the cylinder when said piston body is co-axially positioned for reciprocating movement within the cylinder, said piston body containing an annular recess formed in said peripheral wall and opening toward the interior wall of the cylinder;
 (B) a source of gas under pressure; and
 (C) bearing means for generating a gas layer within the clearance space between said piston body and the interior wall of the cylinder to hold said peripheral wall out of contact with the interior wall of the cylinder during reciprocating movement of said piston assembly, said bearing means including a radially expandable and compressible ring positioned within said annular recess externally in contact with the gas layer, and said bearing means further including therein gas flow restriction means in communication internally with said source of gas for controllably directing gas under pressure from said source to position a portion of said gas layer between said ring and the interior wall of the cylinder to hold said ring out of contact with said interior wall during operation of the piston assembly and for establishing a controlled flow of gas into the gas layer to cause the gas layer to impart a radially inwardly directed force on said ring, said gas flow restriction means including as a means for providing said controlled flow of gas a flow passage contained within said ring and communicating at one end with said source of gas and at another end with said gas layer.

14. A piston assembly as defined in claim 13, wherein said bearing means further includes biasing means for imparting to said ring an outwardly directed radial force having a magnitude intermediate the magnitude limits of said radially inwardly directed force imparted to said ring by the gas layer to cause each circumferential portion of said ring to seek such a force balanced radial position.

15. A piston assembly as defined in claim 14, wherein said source of gas under pressure includes a gas reservoir chamber contained in said piston body and gas trapping means for allowing gas to flow from the variable volume chamber into said gas reservoir chamber when the gas pressure in the variable volume chamber is above the gas pressure within said gas reservoir chamber and for impeding reverse flow when the gas pressure in the variable volume chamber is below the gas pressure within said gas reservoir chamber.

16. A piston assembly as defined in claim 15, wherein said ring is formed in equal arcuate segments extending end-to-end around said piston body, thereby forming end-to-end joints between adjacent segments.

17. A piston assembly as defined in claim 16, wherein said biasing means includes gas pressure mens for subjecting a predetermined area of an interior surface of each said ring segment to gas pressure from said reservoir chamber.

18. A piston assembly as defined in claim 17, wherein said predetermined area is defined by a pair of annular resilient seals positioned between said piston body and each said ring segment to provide a predetermined radially outward bias to each said ring segment.

19. A piston assembly as defined in claim 18, wherein said bearing means further includes joint sealing means for rendering the end-to-end joints between adjacent ring segments substantially impervious to radial gas flow.

20. A piston assembly as defined in claim 17, wherein said biasing means includes an expandable gas cavity, each said ring segment forming a movable wall of said expandable gas cavity.

21. A piston assembly as defined in claim 20, wherein said gas flow restriction means includes at least one restricted flow passage formed in each said ring segment extending between a corresponding expandable gas cavity and an exterior surface of said ring segment.

22. A piston assembly as defined in claim 21, wherein the area on the exterior surface of each said ring segment subjected to gas pressure by the gas layer is greater than the area of the interior surface of each said ring segment subjected to gas pressure by said gas pressure means.

23. A piston assembly as defined in claim 22, wherein each said ring segment has an axial length substantially greater than its radial thickness, each said ring segment having an upper axial end closest to the variable volume chamber and a lower axial end furtherest from the variable volume chamber.

24. A piston assembly as defined in claim 23, wherein each said flow passage opens into the exterior surface of each said ring segment intermediate the upper and lower axial ends thereof, and wherein said annular recess is formed to cause the interior surface of each ring segment immediately adjacent said upper axial end to be subjected to a gas pressure same as that which exists within adjacent portions of the gas layer to tend to balance bending moments imparted to said ring segment caused by increasing gas pressure within the variable volume chamber.

25. A piston assembly as defined in claim 23, wherein each said ring segment includes a radially inwardly directed flange adjacent said upper axial end, said annular recess including an annular groove shaped and positioned to receive said inwardly directed flange.

* * * * *